US005952031A

United States Patent [19]

Fischer

[11] Patent Number: 5,952,031

[45] Date of Patent: Sep. 14, 1999

[54] PRODUCT RECOVERY METHOD FOR BEVERAGE BLENDING

[75] Inventor: Otto H. Fischer, Charleston, S.C.

[73] Assignee: Sasib Beverage and Food of N.A., Inc., Goose Creek, S.C.

[21] Appl. No.: 08/918,399

[22] Filed: Aug. 26, 1997

Related U.S. Application Data

[60] Provisional application No. 60/024,369, Aug. 27, 1996.

[51] Int. Cl.[6] ................................ A23L 2/00; C12G 1/06

[52] U.S. Cl. ............................................ 426/590; 426/477

[58] Field of Search ..................................... 426/477, 590

[56] References Cited

U.S. PATENT DOCUMENTS 4,857,355 8/1989 Gregg ..................................... 426/477

5,314,703 5/1994 Gibney et al. .......................... 426/477

*Primary Examiner*—Anthony J. Weier

*Attorney, Agent, or Firm*—B. Craig Killough

[57] ABSTRACT

A charge is formed of beverage concentrate and water, and is introduced into a filling line having residual water present from cleaning or purging. The charge is removed from the filling line and transported into a recoupment tank which communicates with the line. The charge, which is only a small percentage of the total batch of beverage to be processed and filled, is slowly introduced into the filling line, combining minute proportions of the charge into the production run of blended beverage. The resulting blended beverage is within the required tolerances for a standard blend ratio, and no expensive concentrate is wasted on start up of the line.

4 Claims, 1 Drawing Sheet

PRODUCT RECOVERY METHOD FOR BEVERAGE BLENDING

The application claims the benefit of U.S. Provisional application Ser. No. 60/024,369filed Aug. 27, 1996.

FIELD OF THE INVENTION

This invention relates to beverage blending generally, and is specifically directed to a device and method for eliminating the loss of beverage product on startup of production blending and filling lines.

BACKGROUND OF THE INVENTION

Beverage concentrates are blended with water in production to produce a beverage for consumption. The beverage is placed into small containers by filling machines, for delivery of the beverage to the consumer.

Soft drink syrups, juice concentrates, and other concentrates are blended with water during processing to form a beverage. From time to time, these lines are shut down and purged of the concentrate and beverage. The reasons for purging the filling line include cleaning the filling line at the end of a production run, and preparing the filling line for running a different type of concentrate. For example, it is very common for a soft drink filling line to run more than one flavor or type of soft drink. Accordingly, the syrup and soft drink must be cleaned from the filling line prior to introducing a different flavor of syrup into the filling line.

The filling line is cleaned by forcing water through the filling line to remove the syrup concentrate or beverage. Residual water remains within the filling line, meaning that when the filling line is restarted, the blended beverage initially exiting the filler has proportionately too much water. That is, the standard, and required, ratio of concentrate to water will be too low, due to the excess water which is present in the filling line from the cleaning or change over operation.

In the prior art, to eliminate this problem, the blended beverage is discarded until the standard and required blend ratio is reached. This method results in substantial waste and expense, due to the concentrate which is disposed of. Alternatively, the prior art has attempted to resolve this problem by taking into account the approximate amount of water left in the processor and filler, and modifying the initial blend ratio to account for the excess water which is present in the filling line. However, this method is not reliable in reaching the required blend ratio during start up.

SUMMARY OF THE PRESENT INVENTION

The present invention prepares a charge formed of concentrate and water. Normally, this charge will be prepared according to the standard blend ratio of the beverage, but could be modified according to the particular application. After the filling line is cleaned or purged, the charge is introduced into the filling line, including the filler, and if applicable, carbo-cooler. The charge is then removed from the filling line and transported into a recoupment tank which communicates with the line. The charge, which is only a small percentage of the total batch of beverage to be processed and filled, is then slowly introduced into the filling line, combining minute proportions of the charge into the production run of blended beverage. The resulting blended beverage is within the required tolerances for a standard blend ratio, and no expensive product is wasted.

DESCRIPTION OF THE PREFERRED EMBODIMENT

Figure 1:
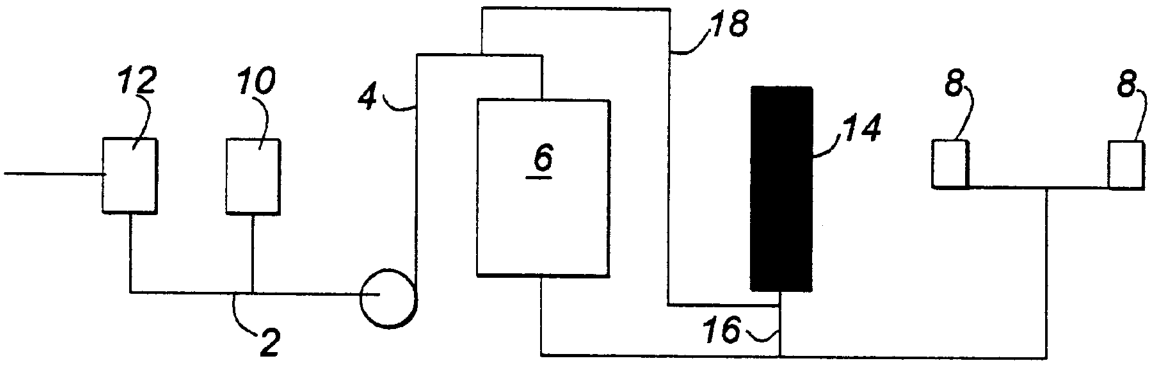
FIG. 1 is a schematic of the apparatus.

FIG. 1 shows the apparatus and demonstrates the method as typically incorporated into a soft drink filling line. The filling line incorporates a proportional blending apparatus 2, which combines a soft drink syrup concentrate and water, to form a soft drink which is insufficiently carbonated. The soft drink is transported through transport line 4 into a carbocooler 6, where carbon dioxide is dissolved into the soft drink. The soft drink is then transported to a filler 8. The filler packages the soft drink in containers, such as cans or bottles, as required.

The proportional blender, the carbo-cooler and the filler, and the lines by which these devices communicate, are purged with water for cleaning or change over of production runs. Residual water remains in each of the devices and in the lines, such that upon start up, the soft drink which exists in the filler has an insufficient ratio of concentrate to water, due to the excess water which remains from cleaning or change over. In the present invention, a charge of concentrate is mixed with water to form a beverage. In the soft drink filling device shown in FIG. 1, the charge may be prepared by mixing a quantity of the soft drink syrup concentrate to be run in production with water, according to the standard blend ratio. Experience could indicate that the charge could be prepared with slightly more concentrate, to account for the residual water. However, such precision is not normally required to employ the present invention to achieve a production blend which is within required tolerances. The charge may be prepared using the existing proportioner, filling the syrup tank 10 and water tank 12 to blend the initial charge to the standard blend ratio.

After the charge is prepared, it is introduced into the filling line, including the carbo-cooler, and the filler. However, the filler is not operational, and is not placing the beverage into containers or packages. Rather, after the charge is completely introduced into the filling line, the charge is then removed from the filling line, and placed into the recoupment tank 14. The recoupment tank is shown as communicating with the filling line in drawing FIG. 1. In the preferred embodiment, the charge is introduced into the recoupment tank by means of line 16 which communicates with the filling line between the carbo-cooler and the filler.

After the charge is removed from the filling line, the production run is started, with the proportional blending device mixing water and syrup to form a soft drink. The soft drink exits the blending device, and is transported through the lines into the carbo-cooler. Prior to entering the carbo-cooler, the production soft drink is blended with the charge which exits the recoupment tank, through transport line 18, which communicates with the transport line prior to the transport line 4 entering the carbo-cooler 6. The amount of the charge which enters the production soft drink is minute, or extremely small, as compared to the volume of soft drink which is being transported from the proportional blending unit into the carbo-cooler. Accordingly, the blend ratio is not substantially effected, and the soft drink remains within specifications for the blend ratio. The soft drink is then carbonated by means of the carbo-cooler, and placed into packaging by means of the filler.

The present invention substantially eliminates the loss of concentrate which is normally experienced in beverage blending and filling due to residual water in the system from cleaning or charge over. The recoupment tank allows the blended beverage, which would normally be out of specification due to the residual water, to be recovered and then slowly introduced into the production run so as to not waste the concentrate, while maintaining a production beverage which is within the required specifications for blending.

What is claimed is:

1. In a beverage processing system having a blending proportioner and a filler, a method of recovering beverage concentrate introduced during start up of the beverage processing system comprising the steps of:

a. blending water and concentrate to form a charge;

b. introducing said charge into a filling line which in turn comprises a filler, prior to beginning a container fill process performed by the filler;

c. removing said charge from said filling line prior to beginning a container fill process performed by the filler;

d. transferring substantially all of said charge into a recoupment tank;

e. initializing and continuing to operate the container fill process while continuously blending water and concentrate to form a beverage, and introducing said beverage into said filling line and transporting said beverage through said filling line to said filler;

f. introducing a stream of said charge into said filling line and said beverage by transferring said charge from said recoupment tank to said filling line.

2. In a beverage processing system having a blending proportioner and a filler, a method of recovering beverage concentrate introduced during start up of the beverage processing system as described in claim 1, wherein a portion of said charge is continuously introduced into said filling line and said beverage by transferring said charge from said recoupment tank into said filling line, until said charge is substantially depleted.

3. In a beverage processing system having a blending proportioner and a filler, a method of recovering beverage concentrate introduced during start up of the beverage processing system comprising the steps of:

a. blending water and concentrate to form a charge;

b. introducing said charge into a carbonation device and filling line which are connected to a filler, prior to beginning a container fill process performed by the filler;

c. removing said charge from said carbonation device and said filling line prior to beginning a container fill process performed by the filler;

d. transferring substantially all of said charge into a recoupment tank;

e. initializing and continuing to operate the container fill process by means of said filler, while continuously blending water and concentrate to form a beverage, and introducing said beverage to said carbonation device and filling line, and transporting said beverage through said filling line to said filler; and f. introducing said charge into said filling line upstream from said carbonation device and into said beverage by transferring said charge from said recoupment tank to said filling line.

4. In a beverage processing system having a blending proportioner and a filler, a method of recovering beverage concentrate introduced during start up of the beverage processing system as described in claim 3, wherein a portion of said charge is continuously introduced into said filling line upstream from said carbonation device and said beverage by transferring said charge from said recoupment tank into said filling line, until said charge is substantially depleted.

* * * * *